(12) United States Patent
Frtunik et al.

(10) Patent No.: US 10,082,128 B2
(45) Date of Patent: Sep. 25, 2018

(54) WAVE POWER GENERATION SYSTEM AND METHOD

(71) Applicant: DDNT CONSULTANTS AUSTALIA PTY LTD, Sydney (AU)

(72) Inventors: Dalibor Frtunik, Sydney (AU); George Brawley, Sydney (AU)

(73) Assignee: DDNT Consultants Australia Pty Ltd., Sydney (AU)

( * ) Notice: Subject to any disclaimer, the term of this patent is extended or adjusted under 35 U.S.C. 154(b) by 0 days.

(21) Appl. No.: 14/406,050

(22) PCT Filed: Jun. 5, 2013

(86) PCT No.: PCT/AU2013/000596
§ 371 (c)(1),
(2) Date: Dec. 5, 2014

(87) PCT Pub. No.: WO2013/181701
PCT Pub. Date: Dec. 12, 2013

(65) Prior Publication Data
US 2015/0152835 A1   Jun. 4, 2015
US 2017/0321650 A9   Nov. 9, 2017

(30) Foreign Application Priority Data

Jun. 5, 2012 (AU) .............................. 2012902350

(51) Int. Cl.
*F03B 13/00* (2006.01)
*F03B 13/20* (2006.01)
(Continued)

(52) U.S. Cl.
CPC .............. *F03B 13/20* (2013.01); *F03B 13/10* (2013.01); *F03B 15/00* (2013.01); *H02K 7/1876* (2013.01);
(Continued)

(58) Field of Classification Search
CPC ...... H02P 2101/10; F03B 13/10; F03B 13/20; F03B 15/00; F05B 2220/707
(Continued)

(56) References Cited

U.S. PATENT DOCUMENTS 3,231,749 A  *  1/1966  Hinck, III ............... F03B 13/20
                                                    290/53
3,696,251 A     10/1972  Last et al.
(Continued)

FOREIGN PATENT DOCUMENTS

CA        2698650 A1    10/2011
WO     2009/111/077 A2    9/2009
WO   WO 2010/077158 A1 *  7/2010

*Primary Examiner* — Julio C. Gonzalez
(74) *Attorney, Agent, or Firm* — Knobbe, Martens, Olson & Bear, LLP (57) ABSTRACT

A power generator comprises a casing (110) that in use is deployed in an environment in which the casing is subjected to an excitation motion such as wave motion. A series of masses (101, 103a-c) is located within the casing, wherein at least a first mass is coupled to the casing by a first spring (102), each of the masses is coupled to at least one adjacent mass by a respective spring, and wherein the casing and the series of masses bring a motion of the power generator into resonance with the excitation motion. A plurality of electric machines each comprising a stator and a field source are each associated with a corresponding mass such that a relative motion of a mass and associated electric machine generates electrical power. A power takeoff circuit receives generated electrical power from the plurality of electric machines and outputs electrical power from the power generator.

17 Claims, 7 Drawing Sheets

(51) Int. Cl.
*H02K 35/02* (2006.01)
*H02K 7/18* (2006.01)
*F03B 15/00* (2006.01)
*F03B 13/10* (2006.01)
*H02K 16/00* (2006.01)
*H02P 101/10* (2015.01)

(52) U.S. Cl.
CPC ........ *H02K 35/02* (2013.01); *F05B 2220/707* (2013.01); *F05B 2250/293* (2013.01); *F05B 2270/00* (2013.01); *F05B 2270/706* (2013.01); *H02K 16/00* (2013.01); *H02P 2101/10* (2015.01); *Y02E 10/38* (2013.01); *Y02E 20/14* (2013.01)

(58) Field of Classification Search
USPC .......... 290/42, 43, 53, 54; 60/495, 500, 501, 60/499, 498, 497, 505, 502; 417/331, 417/332
See application file for complete search history.

(56) References Cited

U.S. PATENT DOCUMENTS

| | | | |
|---|---|---|---|
| 4,110,630 A | 8/1978 | Hendel | |
| 5,578,877 A * | 11/1996 | Tiemann | B61D 43/00 290/1 R |
| 7,305,823 B2 * | 12/2007 | Stewart | F03B 13/1845 290/42 |
| 7,443,046 B2 * | 10/2008 | Stewart | F03B 13/20 290/42 |
| 7,658,067 B2 * | 2/2010 | Gerber | F03B 13/20 60/496 |
| 7,692,320 B2 * | 4/2010 | Lemieux | H02K 35/02 290/1 R |
| 8,350,394 B2 * | 1/2013 | Cottone | H01L 41/125 290/1 E |
| 8,378,511 B2 * | 2/2013 | Sichau | F03B 13/1855 290/42 |
| 8,841,788 B2 * | 9/2014 | Sampaio | F03B 13/16 290/42 |
| 2007/0257491 A1 * | 11/2007 | Kornbluh | F03B 13/1845 290/53 |
| 2009/0085357 A1 * | 4/2009 | Stewart | F03B 13/16 290/53 |
| 2009/0160191 A1 * | 6/2009 | Beane | F03B 13/20 290/53 |
| 2011/0109102 A1 * | 5/2011 | McCoy | F03G 7/08 290/1 R |
| 2012/0248774 A1 * | 10/2012 | Stewart | F03B 13/20 290/53 |
| 2012/0248775 A1 * | 10/2012 | Stewart | F03B 11/00 290/53 |
| 2015/0145250 A1 * | 5/2015 | Frtunik | H02K 35/02 290/42 |

* cited by examiner

WAVE POWER GENERATION SYSTEM AND METHOD

FIELD OF THE INVENTION

The present disclosure relates to devices that passively tune themselves to different frequencies of motion. The devices include ocean wave power generation devices, in particular a device that can be deployed as a buoy that passively optimizes its own motion to maximize power extracted from ocean waves.

BACKGROUND OF THE INVENTION

There have been many proposals for devices that generate electricity from the motion of ocean waves for over a century. Devices generally attempt to convert ocean waves into motion that can be used to drive a turbine or linear motor to produce electricity, with the majority of devices falling into the former category. Some devices do not generate electricity directly, but convert the mechanical energy of ocean waves to another form of mechanical energy that can be used to do work.

Many problems confront the successful commercial exploitation of power from ocean waves.

The ocean is a difficult environment. The ocean tends to damage any exposed object, from those externally simple as ship hulls to moving propellers. Exposed moving parts are most susceptible to damage. This contributed to the early commercial failure, for example, of the Pelamis wave converter, which required constant, expensive maintenance. A lack of robustness makes practical power generation impossible.

Ocean waves are not regular and do not provide a constant motion. All power generators based on motion rely on the motion being constant in one direction for a period of time. Ocean waves change 'direction' with every single wave as it peaks and troughs. This is typically overcome by converting the mechanical potential energy in a wave into another type of energy (e.g. pumping water or turning a rotary turbine). Conversions of energy lead to inefficiencies.

Mooring is often a problem. Many devices use a fixed mooring or heavy weight as a 'mechanical ground.' A mooring that can withstand being so used is expensive and difficult to install, as well as being impractical in deeper waters; a separate 'mechanical ground' is expensive to transport and makes device service more expensive by restricting the mobility and accessibility of a device.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In broad terms the present invention relates to a device that passively distributes energy it absorbs through its internal components to bring the motion of the device into resonance with an external excitation, for example ocean waves. A sealable floating device is described in which internal components and their floating casing are connected to devices for generating electricity by virtue of their relative motion. By bringing the motion of the floating casing into resonance with the external excitation, the net energy absorbed by the system from the ocean is increased.

According to a first aspect of the invention there is provided a wave power generator comprising:

a buoyant casing intended to float in a body of water;

a series of masses within the casing, wherein at least a first mass is coupled to the casing by a first spring, each of the masses is coupled to at least one adjacent mass by a respective spring, and wherein the casing and the series of masses bring a motion of the wave power generator into resonance with waves in the body of water;

a plurality of electric machines each comprising a stator and a field source, each electric machine associated with a corresponding mass such that a relative motion of a mass and the casing causes the corresponding electric machine to generate electrical power; and a power takeoff circuit that receives generated electrical power from the plurality of electric machines and outputs electrical power from the wave power generator.

According to a second aspect of the invention there is provided a power generator comprising:

a casing that in use is deployed in an environment in which the casing is subjected to an excitation motion;

a series of masses within the casing, wherein at least a first mass is coupled to the casing by a first spring, each of the masses is coupled to at least one adjacent mass by a respective spring, and wherein the casing and the series of masses bring a motion of the power generator into resonance with the excitation motion;

a plurality of electric machines each comprising a stator and a field source, each electric machine associated with a corresponding mass such that a relative motion of a mass and associated electric machine generates electrical power; and a power takeoff circuit that receives generated electrical power from the plurality of electric machines and outputs electrical power from the power generator.

According to a further aspect of the invention there is provided a self-tuning mass damper comprising:

a casing that in use is deployed in an environment in which the casing is subjected to an excitation motion;

a series of masses within the casing, wherein at least a first mass is coupled to the casing by a first spring, each of the masses is coupled to at least one adjacent mass by a respective spring, and wherein the casing and the series of masses bring a motion of the mass damper into resonance with the excitation motion;

a plurality of electric machines each comprising a stator and a field source, each electric machine associated with a corresponding mass such that a relative motion of a mass and associated electric machine generates electrical power; and power draining means that receives generated electrical power from the plurality of electric machines and either outputs electrical power from the mass damper or drains the electrical power to an electric load.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
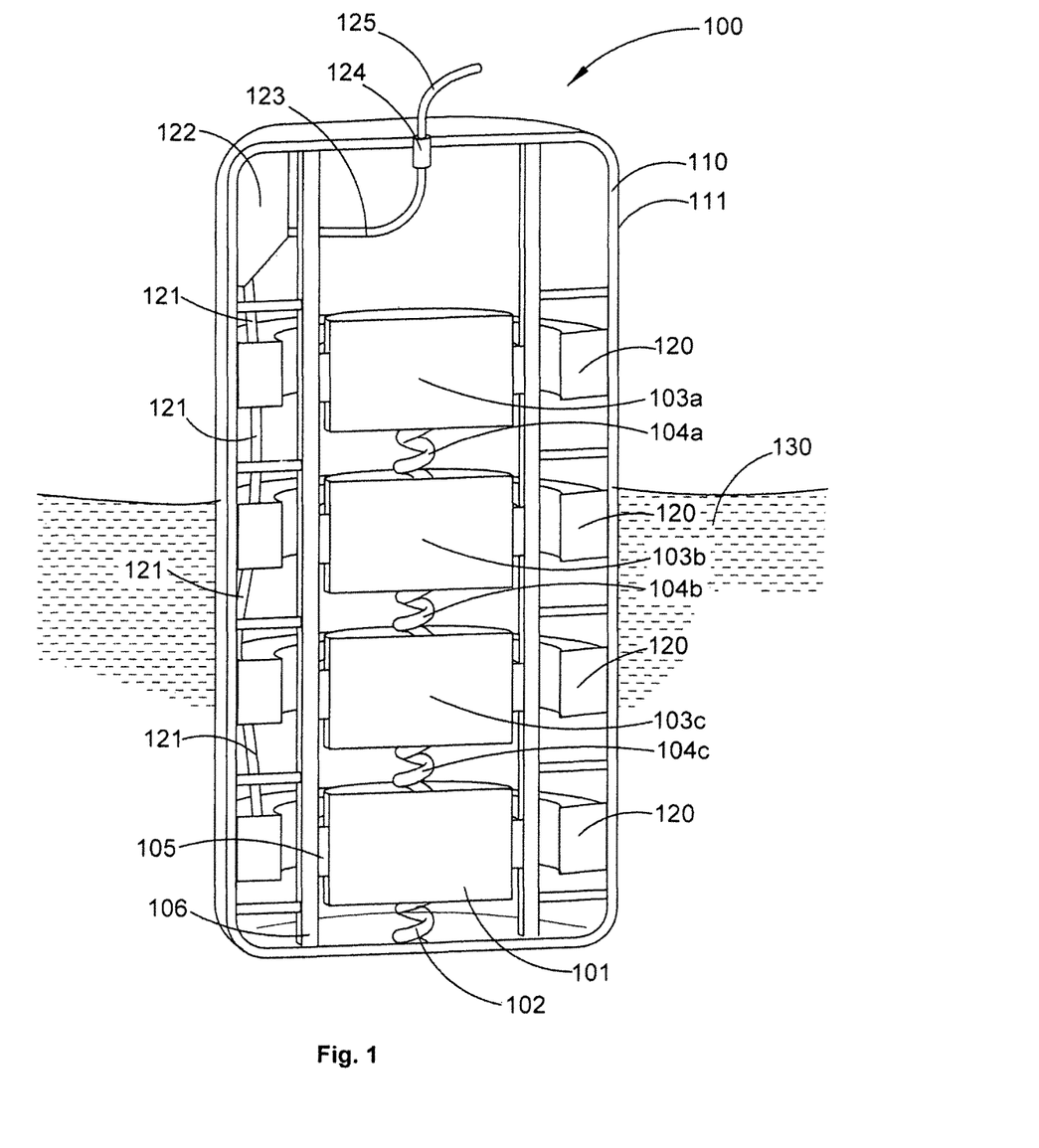
FIG. 1 shows a schematic diagram of an embodiment of device for wave power generation.

FIG. 1 shows a schematic diagram of a device 100 for wave power generation. The device 100 has an external casing 110 that, in use, floats in the ocean 130 or another body of water sufficiently large to provide wave energy to the device 100. Within the device 100 there is a vertical distribution of internal masses connected by springs. In the illustrated embodiment there are four vertically distributed masses 101, 103a, 103b, 103c. The bottom mass 101 is joined to the external casing 110 by a spring 102. Mass 103c is located above the bottom mass 101 and is connected to it by spring 104c. Mass 103b is located above the mass 103c and is connected to it by spring 104b. Mass 103a is located above the mass 103b and is connected to it by spring 104a.

All masses are constrained to move along the vertical axis of the device 100 on vertical linear bearings fixed to the casing 110. The masses 101, 103a-c are each coupled to respective rollers (for example rollers 105) which move along fixed tracks 106 with low friction, forming the linear bearings.

The masses act as armatures/field sources for linear motor stators 120. Each mass is an armature for a single linear motor, with the size of the springs and spacing of masses chosen to minimize the potential interference of power generation in a given linear motor assembly by an adjacent mass to its proper mass/armature. The linear motor stators 120 are fixed within the casing 110 and positioned so that each stator corresponds approximately to the range of motion of one of the vertically disposed masses 101, 103a-c. Relative motion of a mass and its corresponding stator generates electricity. In an alternative arrangement the stators are coupled to respective masses and the corresponding armatures/field sources are fixed to the casing. In either arrangement there is provided a series of electric machines within the device, such that relative motion of the masses and the casing generates electrical power in the electric machines.

The stators are connected to an inverter 122 by bus bars 121. The bus bars may be connected to bridge rectifiers (not shown) at the inverter or built into each stator. In the latter case, the stators 120 can share a bus bar which runs the length of the casing 110 to the inverter 122. DC/DC converters (not shown) may be required to optimize the electrical system, for example, by maintaining a constant voltage or current output from the bridge rectifiers to a shared bus bar. The use of DC/DC converters will be governed by the circuit design and characteristics of the inverter (if an inverter is employed).

The inverter 122 is connected by a cable 123 to the grid via a power line 125 through a pass-through hydraulic seal 124. The power line 125 may serve as a tether for the device 110. Alternatively, the device 100 may have a separate tether.

The floating device 100 passively distributes energy absorbed through its internal components 101, 103a-c to bring the motion of the device into resonance with the ocean waves. By bringing the motion of the floating casing into resonance with the waves, the net energy absorbed by the system from the ocean is increased.

The multiple mass-spring configuration of device 100 may be regarded as a tuned mass damper, which may be used to reduce the effect of vibrations on attached objects (e.g. automobiles or buildings). In particular, tuned mass dampers may be used to add damping to resonances of objects to which the dampers are attached. Tuned mass dampers may be treated mathematically as a mechanical analogue of an LCR circuit (ie a circuit having inductance, capacitance and resistance), which is the basic component of an electrical transmission line. Electrical transmission lines are used to build resonant circuits. An electrical transmission line is effectively an infinite number of LCR circuits in series.

A stepped transmission line, which is effectively a number of transmission lines in series with different properties may be used to maximize power transfer for a range of different transmission frequencies. The circuit is able to resonate with a range of frequencies without any active control.

The device 100 connects a number of tuned mass dampers in series to provide a mechanical analogue of a transmission line. The properties of the elements in this device 100 are chosen so that its natural resonance is similar to that of an empty, buoyant casing floating in the ocean 130. The properties of the individual mass dampers are varied to create a mechanical stepped transmission line, which is considered to maximize the power it absorbs from a wide range of ocean conditions (analogous to a range of signal frequencies transmitted in an electrical transmission line).

The device 100 may thus resonate with a large variety of ocean wave frequencies. The maximum power provided by an ocean wave driving a buoyant casing 110 is therefore considered to be available for extraction by the components of the device. The relative motion of the free masses and the stators of linear motors enables the generation of power.

The number of masses and stators in device 100 may be varied. One arrangement may use three masses and stators. Additional masses and stators represent the addition of a spring, mass/armature, and stator in a configuration similar to that shown in FIG. 1. The properties of these additional components may differ from those of the other masses and stators.

Masses will typically be made from weighted materials chosen for durability and appropriate size. As the masses act as armatures for the stators in the device, they may be made of a conductive material, or a portion of conductive material connected to a conductor that serves as the armature. Lead, iron, and concrete with iron components can all be used. A linear motor using a permanent magnet may be used as well, in which case the mass may be made of a non-conductive material with rare-earth magnets attached, or of a large rare-earth magnet (in physically smaller implementations).

The springs 102, 104a-c may be steel springs, rolling-lobe air springs, or other devices that apply a restoring force in response to displacement. The external casing 110 may have an anti-fouling coat 111. Methods for preventing fouling in the ocean are well-known.

The inverter 122 in the device 100 may be an intermediate step between the power generated in the device 100 and a central terminus for an installation of buoys, where a separate assembly of inverters and other power control circuits may be used to send power to the grid.

Sensors (not shown) measure the position of the various elements of the system and other parameters (including but not limited to the velocity of components within the device and the device's height relative to the ocean waves). The sensors may include an accelerometer (such as Analog Devices' ADXL330) and a position sensor. For the latter, the device 100 may use a quadrature position encoder (such as BEI Sensor's Industrial Encoder), which is used with many linear motors to measure position. A potentiometer, inductive position sensor, Hall Effect sensor, or similar device could also be used.

Other sensors may be included in the device 100 to facilitate its operation, such as pressure sensors, humidity sensors, temperature sensors, voltmeters and ammeters. These additional sensors may be used to determine if the device 100 is in need of maintenance, and in general low-power sensors will be used. Such additional sensors add operational resilience.

The device may include a microcontroller (not shown) that may be connected to the inverter and a communication device (not shown). The communication device, which may be a wireless communication unit, short-range radio transmitter, or similar device, is used to transmit information about the device 100 to a receiver (not shown). The communication device enables the device 100 to receive signals that may, for example, be used to cause the device to lock the free masses into position for ease of transportation, or to change the damping applied by the inverter. The communication device may also operate over a line, such as an optical fibre, that is part of the tether/power takeoff arrangement 123-125.

The device 100 may have a system for fixing the free masses in place, similar to an elevator brake. This is used to reduce the amplitude of motion of the device in the event that the device requires maintenance, or ocean conditions are too rough for normal operation. This may be governed by signals from the microcontroller, which may originate from the communication device(s) or be governed by separate algorithms that use signals from the sensors as input (for example, to determine when the sea is becoming too rough). Thus, for example, before maintenance of the device, a signal may be sent to the communication device that causes the internal elements of the device to lock in place, making it easier to access the device.

Figure 2:
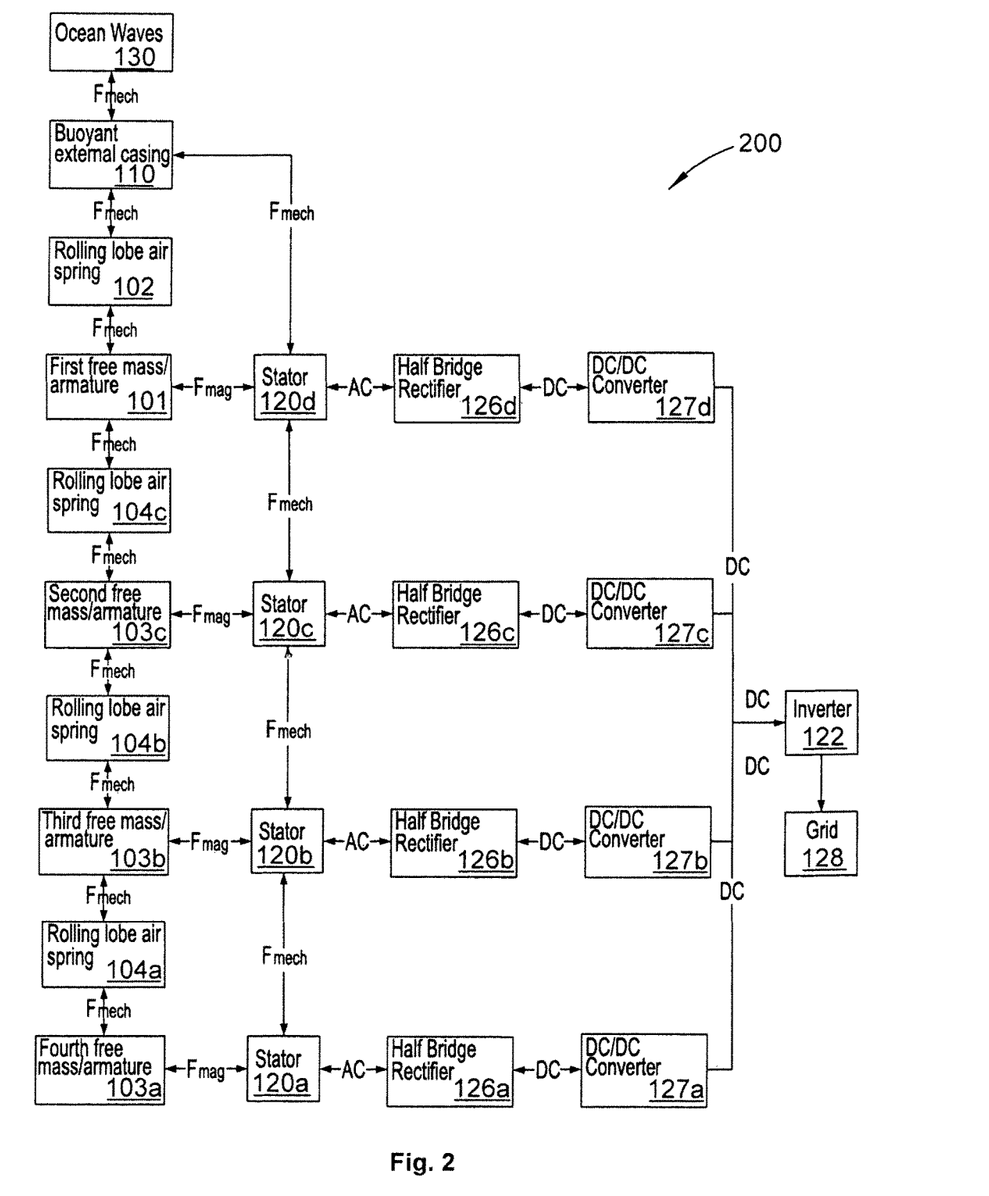
FIG. 2 shows a block diagram of the interactions between the functional components of the device of FIG. 1.

FIG. 2 is a block diagram of the interactions between components of the device 100. The ocean waves 130 impart a mechanical force to the buoyant external casing 110 that in turn imparts a mechanical force to the spring 102, which in one arrangement is a rolling-lobe air spring. The spring 102 is mechanically coupled to the first free mass 101. The first mass 101 is magnetically coupled to its associated stator 120d, and is mechanically coupled to spring 104c, and thereby coupled to the second free mass 103c. The second free mass 103c is magnetically coupled to its associated stator 120c and is mechanically coupled to spring 104b. The third free mass 103b is mechanically coupled to springs 104b and 104a, and is magnetically coupled to its associated stator 120b. The fourth free mass 103a is mechanically coupled to spring 104a and is magnetically coupled to the associated stator 120a.

The four stators are mechanically coupled to the external casing 110.

In use the four stators 120a-d generate alternating current (AC) outputs due to the relative motion of the associated armatures and stators. Each mass is connected to its own three-phase linear motor. Each phase of each linear motor is connected to a bridge rectifier controller circuit 126a-d, so that output current always flows in the same direction. The direct current (DC) output of the rectifiers may pass through a respective DC/DC converter 127a-d before reaching the inverter 122. The output may be connected to a capacitor and/or inverter for energy storage and release to the grid 128.

Figure 3A:
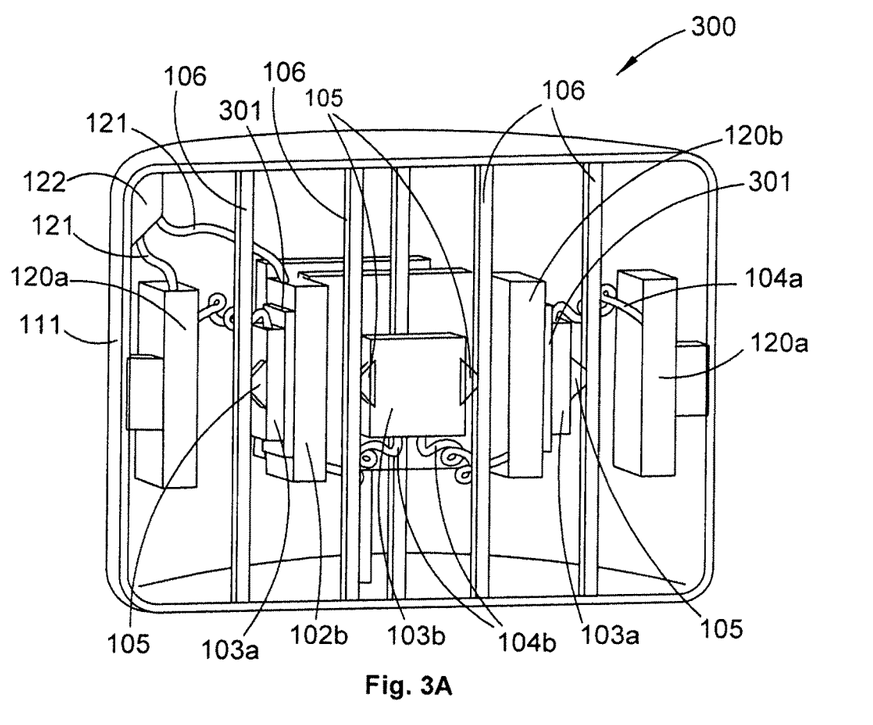
FIG. 3A shows a schematic side view of a second embodiment of a device for wave power generation.

FIG. 3A shows a sectioned side view of an alternate embodiment of the device 300 in which the linear motors are reconfigured as a series of interlocking cylinders connected by force-restoring devices. This design is functionally equivalent to the arrangement of FIG. 1, but may be more viable in applications where a smaller vertical dimension of the casing 110 is required. The arrangement of FIG. 3 resembles the traditional Matryoshka doll. It may be configured with a greater or lesser number of masses and stators.

Figure 3B:
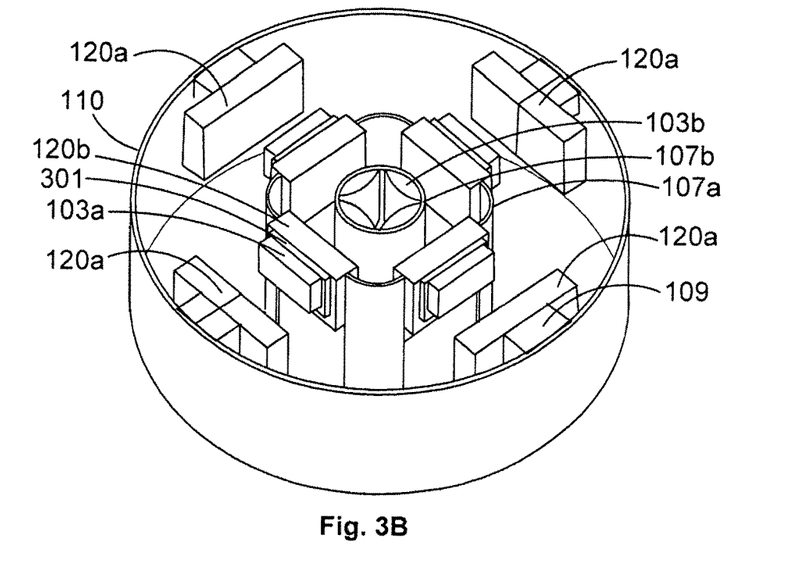
FIG. 3B shows a schematic top view of the device of FIG. 3A.

As before, the device 300 has a buoyant external casing 110 floating in the ocean 130. A plurality of stators 120a are rigidly fixed within the casing 110 for example by struts 109. FIG. 3B is a top view of device 300.

A first circular strut or mount 107a is located concentrically within the casing 110. A plurality of stators 120b are attached to the first circular strut 107a. Each stator 120b is coupled to a corresponding mass 103a by a brace 301. The brace preferably shields the mass 103a and the coupled stator 120b from one another so that there is minimal interaction between them. The brace may be a rigid connection or it may be a connecting spring or other force-restoring device. The stators 120b are closer to the centre of the casing 110 than the masses 103a. The masses 103a are each located near a corresponding fixed stator 120a such that relative movement of a mass 103a and its associated stator 120a generates electric power. The assembly made up of the first circular strut 107a, masses 103a and stators 120b has a vertical extension that is less than the height of the casing 110, and the assembly is free to move up and down along fixed vertical tracks 106. Rollers 105 that move along the tracks 106 are attached to the masses 103a. The tracks 106 and rollers 105 are not shown in FIG. 3B for ease of illustration.

A second circular strut 107b is positioned concentrically within the first circular strut 107a. A plurality of masses 103b are mounted on the second circular strut 107b. Each mass 103b is located opposite a corresponding stator 120b such that relative movement between the masses 103b and stators 120b generates electric power.

Rollers are provided on the second circular strut 107b or the masses 103b to enable the assembly made up of masses 103b and stmt 107b to move up or down tracks 106 (shown in FIG. 3A).

Thus, components are positioned along a radius of the casing 110 in the following order, starting from the centre of the casing: mass 103b, stator 120b, brace 301, mass 103a and stator 120a.

The assembly mounted on the first strut 107a is linked to the casing 110 or the stators 120a by springs 104a. The assembly mounted on the second stmt 107b is linked to the assembly mounted on the first strut 107a by springs 104b.

The stators 120a, 120b are connected to inverter 122 by bus bars 121. The output of the inverter is connected to the grid via a power line through a pass-through hydraulic seal (not shown). The power line may serve as a tether for the device.

Note that the mechanical force transmitted between the fixed stators of the linear motors could be due to a rigid mechanical linkage between them (i.e. because they are all connected to the wall of the casing, as in the case of the device of FIG. 1) or due to springs (as in one embodiment of the stacked 'matryoshka' device of FIG. 3).

Figure 4A:
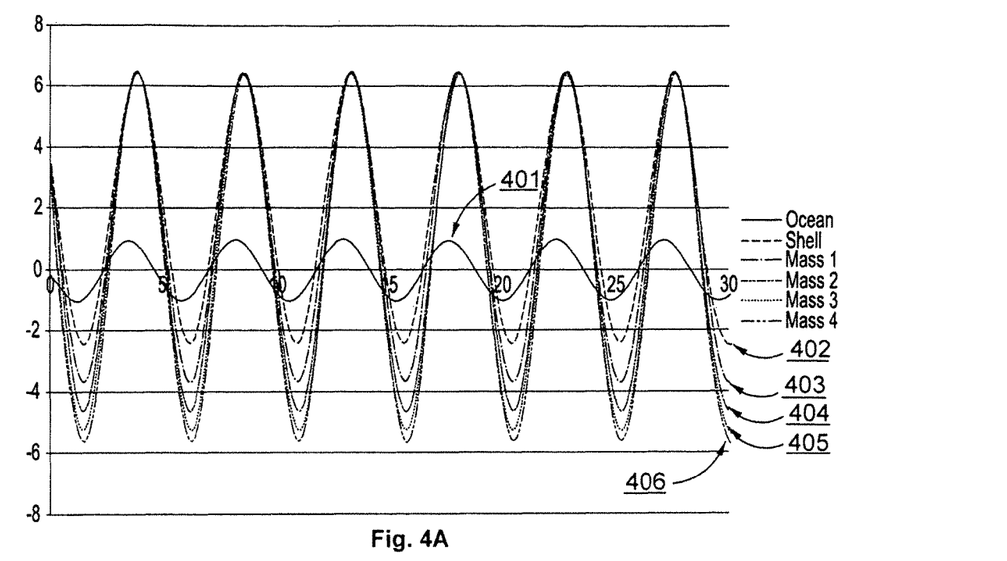
FIGS. 4A and 4B show graphs of the simulated motion of the components of the device of FIG. 1.
Figure 4B:
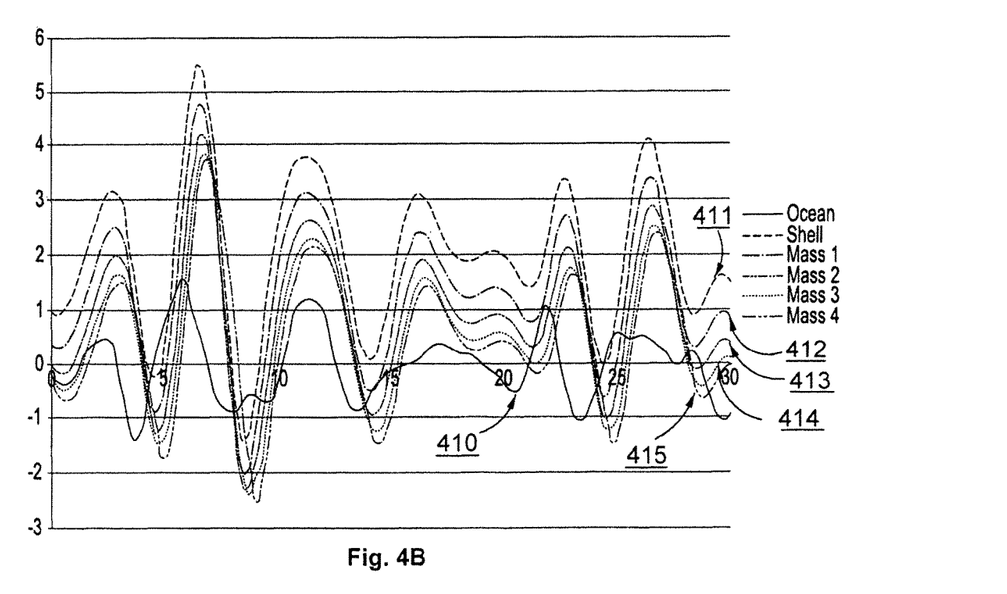

FIGS. 4A and 4B show simulations of the motion of the components of the device 100 when it is immersed in an ocean exhibiting surface waves that act on the device. FIG. 4A shows simulation results obtained when the ocean is modelled as a sine wave 401, to view an idealized behaviour of device 100. FIG. 4A shows the simulated motion of the casing 402. The other four simulated responses 402, 403, 404, 405 show the motion of the masses 101, 103c, 103b, 103a respectively. Each component of the device moves in resonance with the ocean (albeit phase-shifted), with the overall magnitude of motion of each component being greater than the driving wave, due to the resonant motion induced by the behaviour of the system as a mechanical transmission line.

FIG. 4B shows simulation results obtained when the ocean is modelled using algorithms simulating real ocean waves 410, to show the expected behaviour in ocean conditions. FIG. 4B shows the simulated motion 411 of the casing. The other four simulated responses 412, 413, 414, 415 show the motion of the masses 101, 103c, 103b, 103a respectively. Again, each component of the device moves in resonance with the ocean (albeit phase-shifted), with the overall magnitude of motion of each component being greater than the driving wave, due to the resonant motion induced by the behaviour of the system as a mechanical transmission line.

Figure 5A:
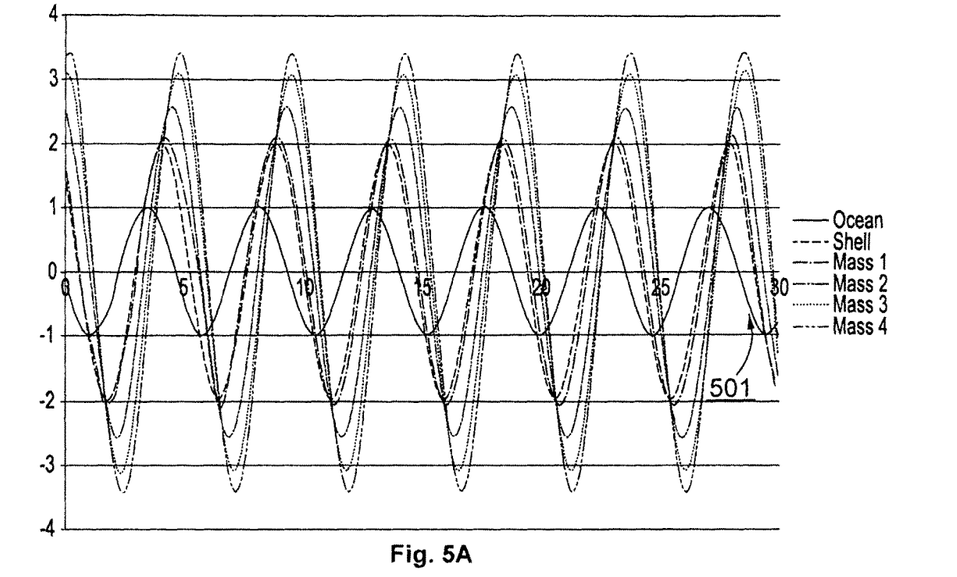
FIGS. 5A and 5B show graphs of the simulated motion of the components of the device of FIG. 3.
Figure 5B:
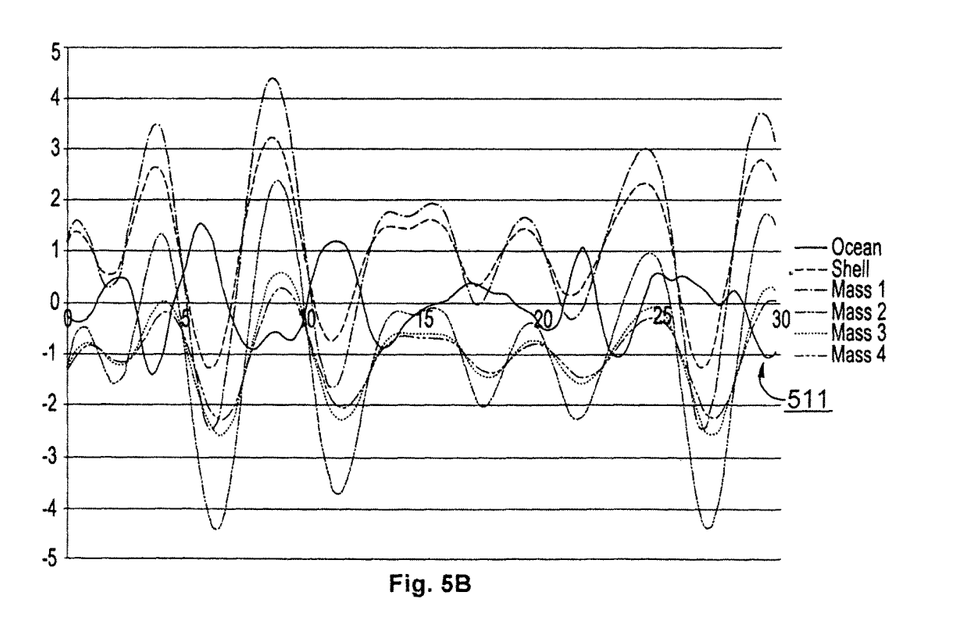

FIGS. 5A and 5B show simulation results of a version of device 300 having four concentrically positioned masses. FIG. 5A shows the idealized simulation in which the ocean is modelled as a sine wave 501. The other five plots in FIG. 5A show the simulated motion of the casing and the four free masses in the device 300.

FIG. 5B shows simulation results obtained when the ocean is modelled using algorithms simulating real ocean waves 511. The other five plots in FIG. 5B show the simulated motion of the casing and the four masses in device 300. Again, each component of the device moves in resonance with the ocean, with the overall magnitude of motion of each component being greater than the driving wave, due to the resonant motion induced by the behaviour of the system as a mechanical transmission line.

Figure 6:
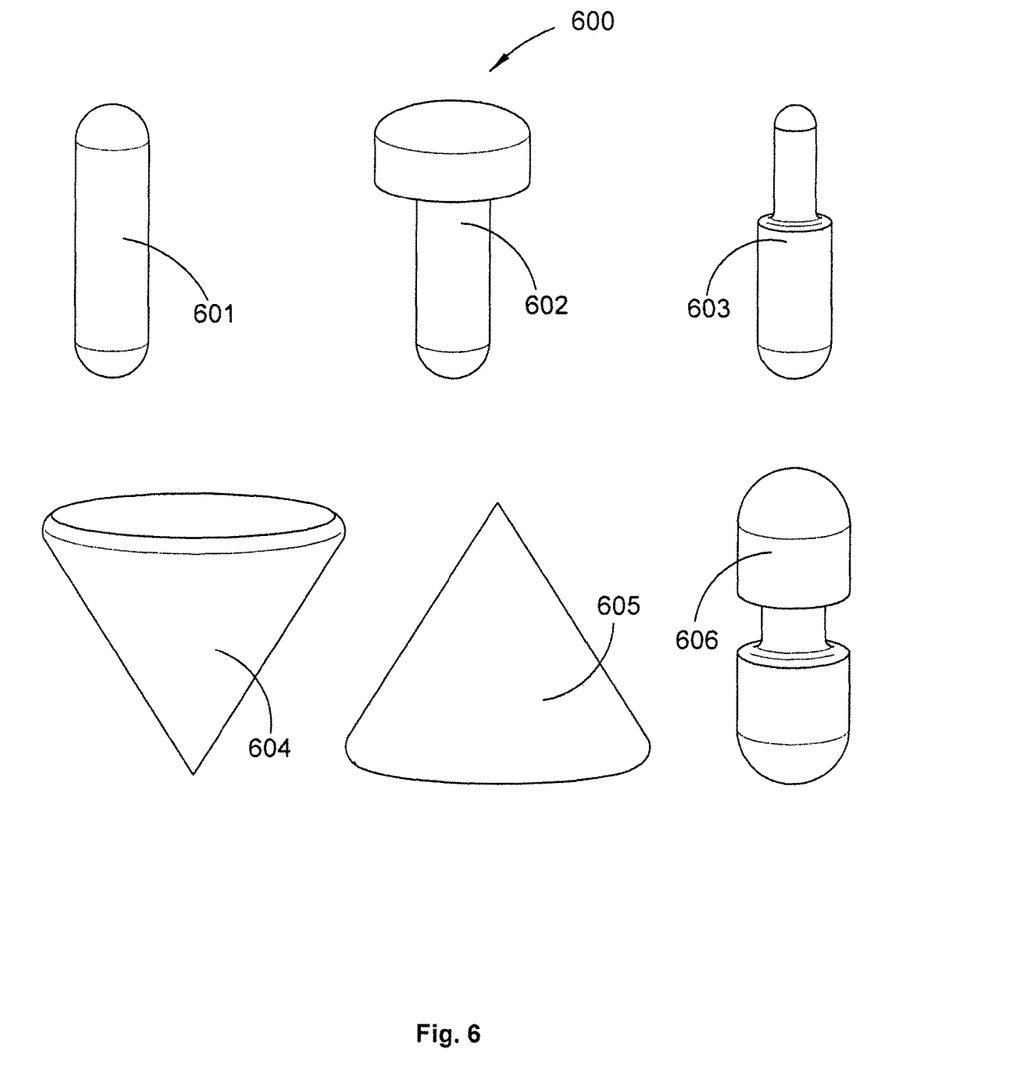
FIG. 6 shows schematic views of a number of different casing designs.
Figure 7:
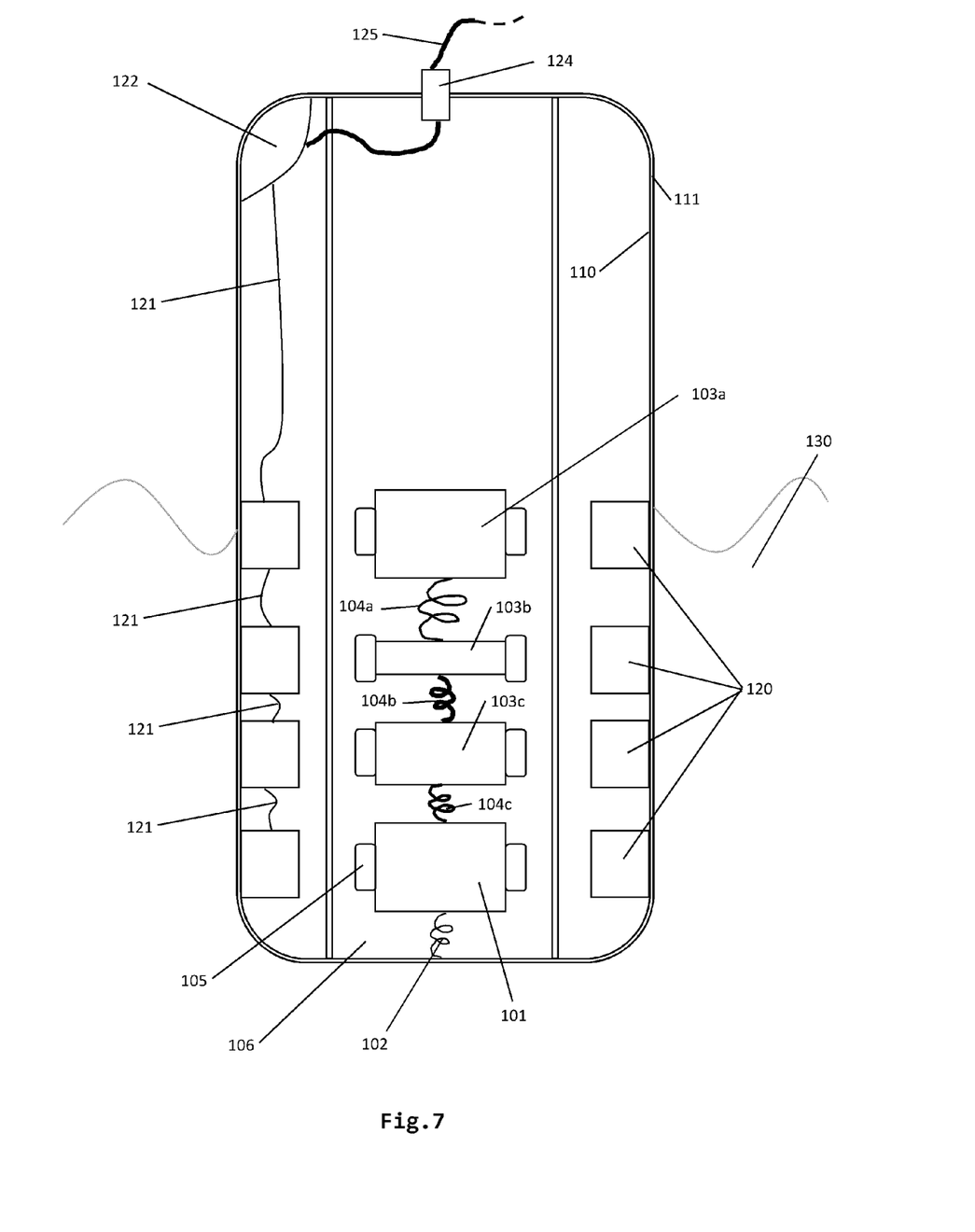
FIG. 7 shows a schematic diagram of another embodiment of a device for wave power generation, in which masses in series differ in weight from one another

FIG. 6 shows a number of different casing options for the device. In each case the internal struts and braces may need to be varied from the basic designs of embodiments described in this document. The casing may have an enlarged top, as in 602, or bottom, as in 603, to provide superior horizontal stability under different ocean conditions and for different configurations of the device. Other designs may affect the buoyant coupling between the device and ocean, as in 604 and 605, or change the natural resonance of the device, as in 606. It should be understood that different case designs are not limited to those in this figure.

Operation of the Device

The device brings its motion into resonance with the ocean passively, meaning that the operation of the device requires it merely to be placed in a body of water experiencing waves in order to generate power.

Various methods are possible for power takeoff, including any of a constant damping applied to each linear generator or simultaneously to all of them connecting the output from each generator to a bridge rectifier; connecting an inverter to the output from each generator separately, or connecting the inverter to the outputs via a shared bus bar; and connecting the inverter to the grid. These methods for power takeoff will be well known to those skilled in the art.

In the devices 100, 300, three or more masses could be employed with identical properties, or three or more masses could be employed having different properties. For example, the masses may have:

different weights;
different (fixed) rates of damping;
variable rates of damping, varying in response to some parameter (e.g. the velocity of the system) and dependent on which mass is involved;
Different spring constants between the masses.

Damping may be varied in a number of ways including changing the voltage on the bus bar and may be controlled by the inverter 122.

The resonance induced in the device means its magnitude of motion is greater than that of the ocean waves which drive it. Furthermore, the mass-spring nature of the system means the casing's motion is shifted by approximately 90 degrees to the driving ocean waves (this shift is affected by the frictional damping of the device moving against the water). The motion of each mass is phase-shifted by some amount that decreases exponentially with each successive mass.

FIGS. 4A and 4B show a diagram of a simulation of the device 100 being driven by a regular sine wave, and a simulation of the device being driven by a curve fitted to ocean wave data. In FIG. 4A, the expected phase shifts between the casing and masses are seen, with the shift reducing exponentially for each successive mass. Table 1 compares the maximum amplitude difference between each successive mass and the previous one, with the difference between the first mass and casing taken as the first in the table. This indicates the diminishing return from adding further masses to the average maximum amplitude of the system, which relates to the power generated.

TABLE 1

|  | Maximum Amp. difference (m) |
|---|---|
| $1^{st}$ mass-casing | 1.28 |
| $2^{nd}$ mass-$1^{st}$ mass | 0.97 |
| $3^{rd}$ mass-$2^{nd}$ mass | 0.65 |
| $4^{th}$ mass-$3^{rd}$ mass | 0.32 |

Table 2 shows the average amplitude of motion of the device elements (i.e. the casing and all the masses) for a device having the structure illustrated in FIG. 1, driven by an ocean modelled as a sine wave (to facilitate comparison between different device parameters). Using the average amplitude of motion of all the components facilitates comparison of the effectiveness of the device design for an increasing number of masses. The device configurations used in the calculation of Table 2 compare an internal device configuration incorporating the same total weight of free masses, and the same total damping across all linear motors in the device. This is thought to ensure that the only way the parameters have an impact is if the transmission line model is viable and improves the resonance of the device and its internal components with the ocean (to maximize power extraction).

TABLE 2

|  | Power (kW) | Average Amp. (m) |
| --- | --- | --- |
| 2 masses | 1.58 | 11.18 |
| 3 masses | 2.3 | 11.87 |
| 4 masses | 3.1 | 12.55 |
| 5 masses | 4.1 | 12.58 |

Increasing the number of masses increases the power generated by the device and the average maximum amplitude, indicating that increasing the number of masses improves the resonant behaviour of the device. There are diminishing returns observed for additional masses beyond the fourth. Embodiments may employ different numbers of masses. Changing the parameters of the masses (i.e. the total weight of all masses and total damping) indicates that for certain parameter choices, particular numbers of masses are optimal. This is because increased power output per added mass is eventually outweighed by increased energy loss per mass in the system (due to parasitic inductance and resistance in the electric components, and friction in the system).

ALTERNATIVE EMBODIMENTS

In further arrangements, additional force-restoring devices may be supplied in either the configuration of FIG. 1 or the configuration of FIG. 3 between the masses and the casing. This couples the motion of more than single element to the casing, affecting the interactions between the components in a way that may be favourable to energy extraction from the system in particular seas or in the event of extreme ocean conditions.

The devices is employed to extract energy from any system exhibiting excitation along a particular axis. For example, the device can be used as an enhanced mass damper that passively tunes itself to different frequencies of motion. This embodiment could be employed, for example, in structures which may experience undesirable resonant excitation for more than one resonant frequency in a particular direction. Thus the described devices may be used in other applications, where the input motion has a source other than the ocean waves.

Employing the device as a passively self-tuning mass damper has additional applications. For example, an appropriately scaled version of the device could be employed in an aerial or space vehicle to dampen resonant modes occurring as the mass of the vehicle changes in flight due to fuel consumption. The device could be employed on other ocean-going vessels such as ships or oil rigs, to dampen resonant modes caused by waves of particular frequencies. For example, this could be used to stabilize oil rigs driven to horizontal resonance by a particular wave period. The device could also be employed to stabilize engine housings where the engine oscillation excites a mechanical resonance in the housing.

If the device is used as a passively self-tuning mass damper, the electrical power generated by the relative motion of the components may be output as electrical power or drained to an electrical load, for example where the power is dissipated as heat.

The devices described herein are able to resonate with a large variety of ocean wave frequencies. The maximum power provided by an ocean wave driving a buoyant casing is therefore available to be extracted by the components of the device. No active control system is required for this operation. Combining the free masses used in the mechanical analogue of a transmission line with the armatures of linear motors enables their motion to be used to generate power.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A passively self-tuning wave power generator comprising:
   a buoyant casing intended to float in a body of water;
   a series of masses within the casing, wherein at least a first mass is coupled to the casing by a first spring, each of the masses is coupled to at least one adjacent mass by a respective spring;
   a plurality of electric machines each comprising a stator and a field source, each electric machine associated with a corresponding mass and spring to provide a tuned mass damper configured such that a relative motion of a mass and the casing causes the corresponding electric machine to generate electrical power; and
   a power takeoff circuit that receives generated electrical power from the plurality of electric machines and outputs electrical power from the wave power generator;
   wherein the individual mass dampers are configured to resonate at different harmonic frequencies to provide a mechanical analogue of a stepped transmission line such that the casing and the series of tuned mass dampers passively bring a motion of the wave power generator into resonance with waves in the body of water across a variety of wave frequencies.

2. A wave power generator according to claim 1 wherein the series of masses is distributed vertically within the buoyant casing.

3. A wave power generator according to claim 2 wherein the masses are constrained to move along a vertical axis of the buoyant casing.

4. A wave power generator according to claim 3 comprising at least one track, wherein the masses move along the at least one track.

5. A wave power generator according to claim 1 wherein the masses are further coupled to the casing by respective further springs.

6. A wave power generator according to claim 1 wherein the stators are rigidly coupled to the casing and the field sources are coupled to the respective masses.

7. A wave power generator according to claim 1 wherein the series of masses comprises at least three masses.

8. A wave power generator according to claim 7 wherein at least two masses in the series differ in weight from one another.

9. A wave power generator according to claim 7 wherein at least one mass has a variable rate of damping.

10. A wave power generator according to claim 9 wherein the rate of damping varies dependent on a velocity of the at least one mass.

11. A wave power generator according to claim 7 wherein at least two springs coupling masses in the series of masses have different spring constants from one another.

12. A wave power generator according to claim 7 wherein at least two masses in the series have rates of damping that vary from one another.

13. A wave power generator according to claim 1 wherein the field sources are coupled to the casing and the stators are coupled to respective masses.

14. A wave power generator according to claim 1 wherein the series of masses is horizontally distributed within the casing and the masses are concentrically located.

15. A wave power generator according to claim 14 wherein the plurality of electric machines are horizontally distributed and concentrically located.

16. A wave power generator according to claim 14 wherein the masses are constrained to move along a vertical axis of the casing.

17. A passively self-tuning power generator comprising:

a casing that in use is deployed in an environment in which the casing is subjected to an excitation motion;

a series of masses within the casing, wherein at least a first mass is coupled to the casing by a first spring, each of the masses is coupled to at least one adjacent mass by a respective spring;

a plurality of electric machines each comprising a stator and a field source, each electric machine associated with a corresponding mass and spring to provide a tuned mass damper configured such that a relative motion of a mass and associated electric machine generates electrical power; and a power takeoff circuit that receives generated electrical power from the plurality of electric machines and outputs electrical power from the power generator;

wherein the individual mass dampers are configured to resonate at different harmonic frequencies to provide a mechanical analogue of a stepped transmission line such that the casing and the series of tuned mass dampers passively bring a motion of the power generator into resonance with the excitation motion across a variety of excitation frequencies.

* * * * *